United States Patent
Sell

(10) Patent No.: US 10,920,917 B2
(45) Date of Patent: Feb. 16, 2021

(54) FILTERED GLADHAND CONNECTOR

(71) Applicant: TRAMEC SLOAN, LLC, Iola, KS (US)

(72) Inventor: Edward D. Sell, Iola, KS (US)

(73) Assignee: TRAMEC SLOAN, LLC, Iola, KS (US)

( * ) Notice: Subject to any disclaimer, the term of this patent is extended or adjusted under 35 U.S.C. 154(b) by 554 days.

(21) Appl. No.: 15/850,971

(22) Filed: Dec. 21, 2017

(65) Prior Publication Data

US 2019/0195411 A1 Jun. 27, 2019

(51) Int. Cl.

| | |
|---|---|
| F16L 37/56 | (2006.01) |
| F16L 55/09 | (2006.01) |
| B60T 17/00 | (2006.01) |
| B01D 46/00 | (2006.01) |
| B60T 17/04 | (2006.01) |
| F16L 33/02 | (2006.01) |
| B01D 46/24 | (2006.01) |

(52) U.S. Cl.
CPC .......... *F16L 55/09* (2013.01); *B01D 46/0004* (2013.01); *B01D 46/0012* (2013.01); *B60T 17/002* (2013.01); *B60T 17/043* (2013.01); *F16L 33/02* (2013.01); *B01D 46/2403* (2013.01); *B01D 2265/029* (2013.01)

(58) Field of Classification Search
CPC ............ B01D 46/0004; B01D 46/0012; B01D 46/2403; B01D 2265/029; B60T 17/002; B60T 17/043; F16L 37/56; F16L 55/09; F16L 17/043

USPC ........ 55/385.1; 213/1.3, 76; 303/15; 439/34, 439/195, 288

See application file for complete search history.

(56) References Cited

U.S. PATENT DOCUMENTS

| | | | |
|---|---|---|---|
| 5,129,243 A | * | 7/1992 | Kassebaum ........... B60T 17/043 303/69 |
| 5,240,271 A | | 8/1993 | Hart et al. |
| 5,917,632 A | | 6/1999 | Lesesky |
| 6,120,064 A | | 9/2000 | McNamara |

(Continued)

OTHER PUBLICATIONS

Web Article—Phillips-38 Degree Angle-Service-Blue-Gladhand (2017) 1 page https://www.utility-trailer.com/product/phillips-38-degree-angle-services-blue-gladhand/.

(Continued)

*Primary Examiner* — Minh Chau T Pham
(74) *Attorney, Agent, or Firm* — Winston & Strawn LLP

(57) ABSTRACT

The present invention is directed to a gladhand connector having multiple ports and an integrated filter. The connector has a base that includes an air hose connector clamp on a first surface, and a first access port extending from the first surface toward a second surface, and a second access port on a bottom surface. The access ports are in fluid communication with an intermediate conduit configured to direct air received from an air hose through the housing. The connector also comprises a receptacle adjacent the first access port and in fluid communication with one of the access ports. The receptacle is configured to receive a pressure sensitive, removable and replaceable filter assembly that is configured to filter debris. The filter assembly is displaceable by air pressure of received air. The connector further comprises a mounting bracket configured to be attached to a vehicle.

21 Claims, 12 Drawing Sheets

(56) References Cited

U.S. PATENT DOCUMENTS

| | | | |
|---|---|---|---|
| 6,705,478 B1* | 3/2004 | Engle | B60D 1/64 213/1.3 |
| 7,021,334 B1 | 4/2006 | Helmer | |
| 8,398,120 B2 | 3/2013 | Puluc et al. | |
| 2012/0200078 A1* | 8/2012 | Puluc | F16L 33/00 285/61 |
| 2016/0375393 A1 | 12/2016 | Nagel | |
| 2017/0210397 A1* | 7/2017 | Aiken | B61G 5/08 |
| 2018/0326963 A1* | 11/2018 | Papafagos | B01D 39/12 |

OTHER PUBLICATIONS

Web Article—38 Angle Mount Anodized Gladhand (2017) 2 pages http://www.tectran.com/catalog.asp?main=air&sub1=gladhands_and_accs&sub2=anodized_gladhands&product=angle_anodized_gladhands.

Web Article—38 Bracket Mount Gladhand (2017) 2 pages http//www.tramecsloan.com/products/air-products/gladhands/angled-gladhands/38-bracket-mountgladhand-anodized-service/.

Product Data, PD-109-000, KU13 . . . , KU14 . . . , KU41 . . . , Coupling Heads, Knorr-Bremse Group (2015) 1 page www.knorr-bremse.com, www.knorr-bremseCVS.com.

Trailer Air FiltrationOptions In-Line Filter/Gladhand Filter, Meritor WABCO Vehicle Control Systems (2014) 2 pages.

Trailer ABS In-Line Filter Valve and Gladhands with Integral, Technical Bulletin, FiltersMeritor WABCO Vehicle Control Systems, (2009) 4 pages.

* cited by examiner

FILTERED GLADHAND CONNECTOR

FIELD OF THE INVENTION

The invention relates generally to hose couplers, and more specially, to an improved hose coupler having multiple ports and an integrated filter assembly for use in a tractor-trailer air brake system.

BACKGROUND OF THE INVENTION

Typically, a tractor and its associated trailer incorporate an air brake system that is adapted to provide braking to the wheels of the trailer. Air pressure for the brake system generally is supplied by the tractor, with pressurized air being delivered to the brakes of the trailer through a series of air hoses. Connection of the air brake system of a tractor to that of a trailer typically is accomplished by an air hose coupler or gladhand connector. Generally, the coupler is attached to the front of a trailer and is adapted to be engaged by a gladhand, which is attached to a tractor. The air hoses or the associated air lines supply a constant air supply on one side for supply and emergency system functions and on a second side provide control of air pressure to the brake function when the driver applies the service brake pedal. To protect air brake systems from dirt and debris getting to vital components, filters are frequently used at these two paths. These filters can become easily clogged with dirt and debris when the brake system is used over time. In some instances these filters must be cleaned or replaced on a regular basis to ensure proper brake function of the tractor-trailer.

Existing air hose couplers may have a moveable filter element but lack a securing plate for conveniently mounting the coupler on the trailer. Such devices lack multiple ports for the convenient installation of air hoses. Some products may not be provided with a serviceable face seal in the event the seal should be damaged. Some products have a securing plate and multiple connection options but lack a moveable filter element to avoid blocking the passage of air when the filter is clogged. When air lines are not connected to the trailer gladhand coupler, debris and insects may enter through the open face. Some of these products are manufactured with painted steel components that are color coated for corrosion resistance and quick recognition of the function of the coupler. This color coating may become damaged leading to corrosion and failure of the coupling.

As such, an improved gladhand connector is desirable, and these are now provided by the present invention.

SUMMARY OF THE INVENTION

One embodiment of the present invention relates to a gladhand connector. The gladhand connector comprises a housing having a base that includes a first surface and a second surface; an air hose connector clamp on the first surface; and a first access port extending from the first surface toward the second surface; and a second access port. The access ports are in fluid communication with an intermediate conduit configured to direct air received from an air hose through the housing. The connector also comprises a receptacle adjacent the first access port and in fluid communication with one of the access ports. The receptacle is configured to receive a pressure sensitive, removable and replaceable filter assembly configured to filter debris. The connector further comprises a mounting bracket extending from the base configured to be attached to a vehicle. The intermediate conduit is in fluid communication with the receptacle via one end of the intermediate conduit, and the intermediate conduit is secured to the mounting bracket via another end of the intermediate conduit to prevent air from exiting the mounting bracket.

The receptacle is connected to the base from the second surface and includes a cap that is removable to provide access to the filter assembly, wherein the cap is removable by a hex key.

The connector further comprises a swivel cover on the first surface configured to swivel between an open position and a closed position. The swivel cover closes off the first access port in the closed position.

The filter assembly includes a removable filter cap, a washer, a spring, and a filter screen comprising a wire mesh basket supported in a rigid framework. The filter assembly is configured to be displaced by air pressure of received air to compress the spring and allow the received air to bypass the filter assembly in the event that the filter element becomes obstructed.

The mounting bracket includes one or more holes to receive fasteners. The mounting bracket is also perpendicular to the base.

The clamping bracket part of the coupler is preferably made of stainless steel to provide resistance corrosion and extend the life of the product.

The connector further comprises an elastomeric seal configured to be removably mounted in the first access port.

Either the first access port or the second access port can be configured to receive and connect to an air hose.

Another embodiment of the gladhand connector comprises a housing having a side surface and a bottom surface; a first access port on the side surface and a second access port on the bottom surface; a receptacle connected to the first access port configured to receive a replaceable filter device that filters debris; a mounting bracket extending from the side surface configured to be attached to a vehicle; and a swivel cover attached to the housing through the side surface. The cover is configured to swivel between an open position and a closed position and the cover closes off the first access port in the closed position. The first access port and the second access port define a flow path via a replaceable filter assembly, the first access port is configured to receive air from an air hose and the replaceable filter device is displaceable by air pressure of received air without blocking the flow path.

For this embodiment, the mounting bracket is mounted perpendicular to the side surface of the housing. The mounting bracket also includes one or more holes to receive fasteners. The mounting bracket also seals the flow path to prevent air exiting from the mounting bracket. The mounting bracket further seals the flow path via the intermediate conduit to prevent air exiting from the mounting bracket.

The swivel cover swivels in a direction parallel to the side surface of the housing.

As in the other embodiment, the filter assembly comprises a removable filter cap, a washer, a spring, and a filter screen comprising a wire mesh basket supported in a rigid framework, and is displaceable by air pressure of the air received from the first access port or the second access port without blocking the flow path.

The housing further comprises an intermediate conduit connecting the receptacle and the mounting bracket, and the intermediate conduit forms part of the flow path. The clamping portion of the housing can be made of stainless steel.

The connector further comprises an elastomeric seal configured to be removably mounted in the first access port.

The connector is designed so that either the first access port or the second access port is configured to receive and connect to an air hose.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

DETAILED DESCRIPTION OF THE INVENTION

Unlike prior art devices, the present invention combines a number of desirable and necessary features in a new and improved gladhand connector. The most preferred arrangement comprises a body having a mounting plate for attachment to a cab or trailer, two ports for mounting air hoses depending upon the vehicle, a filter assembly that is removable and that includes a spring to allow easy replacement as well as a way to bypass a clogged filter prior to replacement, and removable seals.

The mounting bracket facilitates support of the air hoses that are attached to it. The mounting bracket reduces the catenary angle that results from an otherwise unsupported air hose that freely traverses the distance between the truck cab and the attached trailer. The mounting bracket is configured to allow the attached hose to follow the typical swag, and this assists in reducing stress on the air hose itself. And the side and bottom openings in the body allows the air hose to be connected in either direction depending upon how they are provided on the trailer.

The connector also includes a swivel cover that can be color coded so that the appropriate device is mounted in the correct location. Typically, two devices are utilized, one for the supply (emergency) system and one for the control (service) system. For example, one gladhand is provided with a blue swivel cap while the other one is provided with a red cap. These are essentially the same structure but the different color caps indicate different polarizations so that the hoses cannot be connected incorrectly. This facilitates manufacture of the two devices with unpainted stainless steel connector portions as the color of the swivel cap and identifies the polarization of the device. The swivel covers provide a means to prevent insects or foreign substances from entering the air system when the trailer couplers are not connected to a tractor.

Finally, manufacturing the housing of aluminum with a hard corrosion resistant treatment and a stainless steel connector portion prevents rusting and unexpectedly prolongs the service life of the connector. And with a replaceable filter assembly and replaceable seals, the gladhand connector can provide years of useful service.

Figure 1:
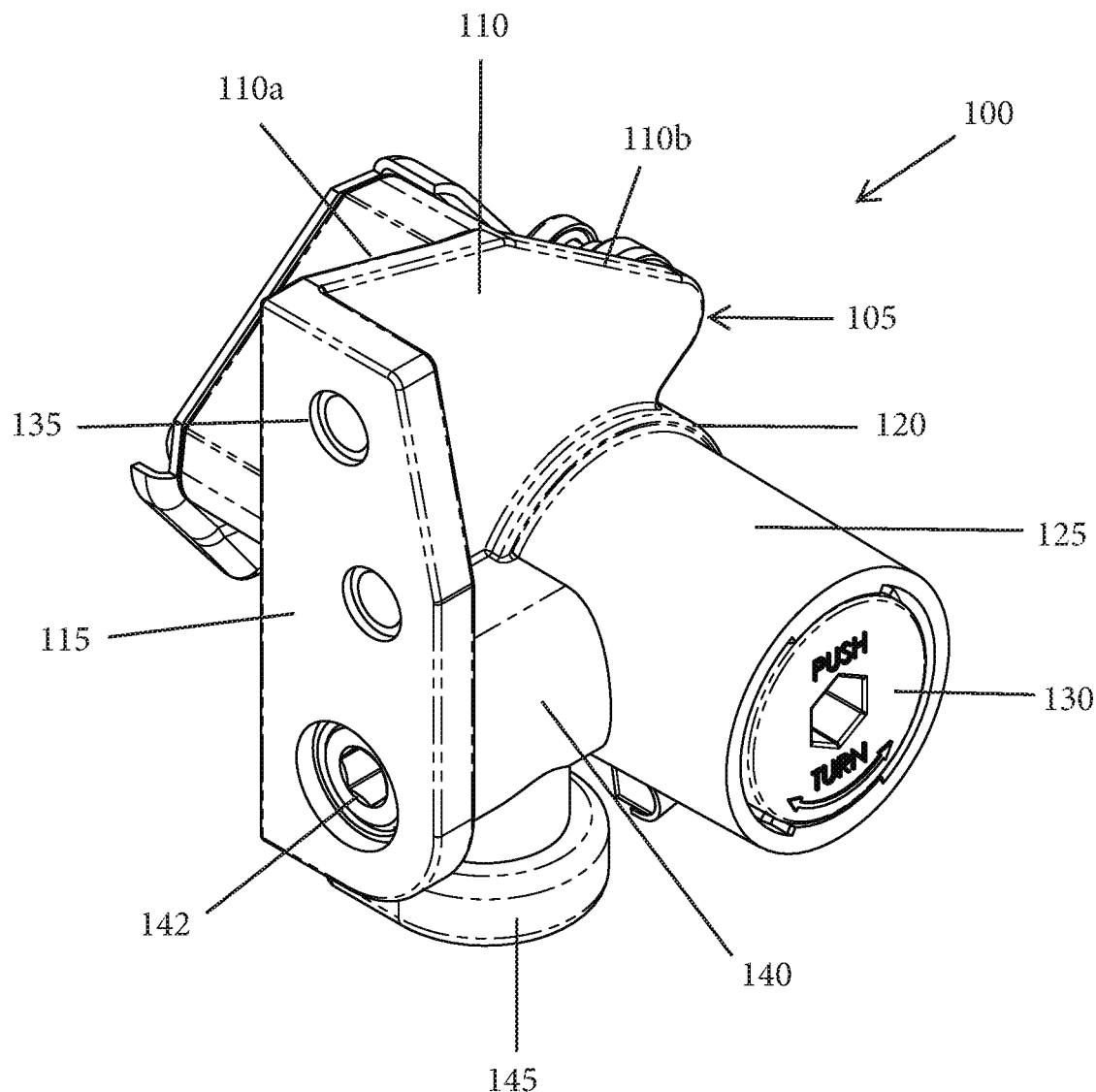
FIG. 1 depicts an isometric back view of an illustrative gladhand connector in accordance with some embodiments of the invention.
Figure 2:
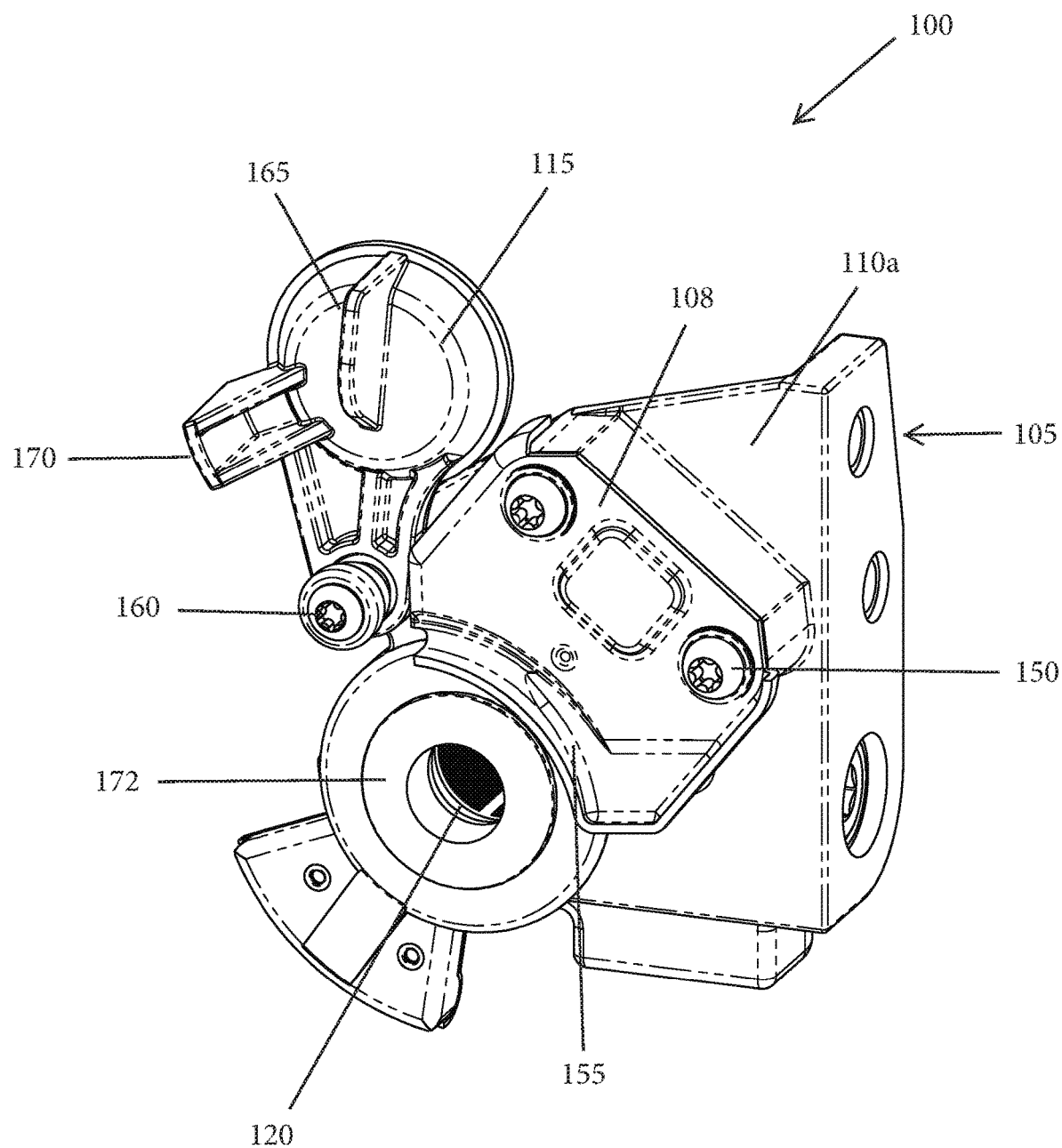
FIG. 2 depicts a view of the illustrative gladhand connector with the swivel cover in the open position in accordance with some embodiments of the invention.

Turning now to the drawings. FIGS. 1-4 depict different views of an illustrative gladhand connector 100 in accordance with some embodiments of the invention. The gladhand connector 100 is configured to receive a SAE J318 standard gladhand. Referring to FIGS. 1-2, the gladhand connector 100 comprises a housing 105, an air hose connector clamp 108, and a swivel cover 115. The housing 105 includes a base 110 and a mounting bracket (or wall) 115. The base 110 includes a first surface 110*a* and a second surface 110*b*. The second surface 110*b* is on a side opposite to the first surface 110*a* and is parallel to the first surface 110*a*. The base 110 also includes a first access port 120 that extends from the first surface 110*a* towards the second surface 110*b* and that is configured to receive air from an air hose. Preferably, the first access port 120 is configured to receive an air hose from a tractor or other vehicle having equipment that can supply air. The housing 105 also includes a receptacle 125 adjacent to the first access port 120 and in fluid communication with the first access port 120. The receptacle 125 is connected to the base 110 or the first access port 120 from the second surface 110*b*. The receptacle 125 is configured to receive a filter assembly that filters debris in fluid and includes a cap 130 that is removable to provide access to the filter assembly. The receptacle 125 is a cylinder but it may also have other structures as long as it can receive a filter assembly.

The mounting bracket 115 extends from the base 110 in a direction perpendicular or substantially perpendicular to the base 110. The mounting bracket 115 is configured to attach the gladhand connector 100 to a vehicle such as a tractor or trailer. The mounting bracket 115 includes one or more holes 135 to receive fasteners. In some embodiments, the mounting bracket 115 may include other structures or mechanisms to attach the gladhand connector 100 to a vehicle. The mounting bracket 115 is configured to reduce the catenary angle that results from an unsupported air hose that is attached to the gladhand connector 100 and that freely traverses the distance between the tractor and the trailer. The mounting bracket 115 allows the attached hose to follow the typical swag and reduce stress on the hose itself.

The housing 105 also includes an intermediate conduit 140. The intermediate conduit 140 is on the second surface 110b connecting the receptacle 125 and the mounting bracket 115. The intermediate conduit 140 is in fluid communication with the receptacle 125 via one end of the intermediate conduit 140 and is secured to the mounting bracket 115 via another end of the intermediate conduit 140 to prevent air escaping from the mounting bracket 115. The intermediate conduit 140 and the mounting bracket 115 may be affixed together to provide an access port 305 shown in FIG. 6 to receive a fastener 142 or other mechanism or structure that can provide an airtight seal (e.g., the connection between the intermediate conduit 140 and the mounting bracket 115 is airtight). The fastener 142 or other mechanism or structure can also be released or disengaged to form another opening.

The housing 105 also includes a second access port 145 that is in fluid communication with the intermediate conduit 140. The second access port 145 is located on a bottom surface of the gladhand connector 100. The air received through the first access port 120 exits from the second access port 145. The second access port 145 is configured to receive an air hose. Preferably, the second access port 145 is configured to receive an air hose from a trailer or other vehicle that requires air to operate the air brake system on that vehicle. The first access port 145 and the second port 305, however, can also be used interchangeably. The first access port 120 can be configured to receive an air hose from a tractor or similar vehicle whereas the second access port 145 can be configured to receive an air hose from a trailer or similar vehicle.

Figure 3:
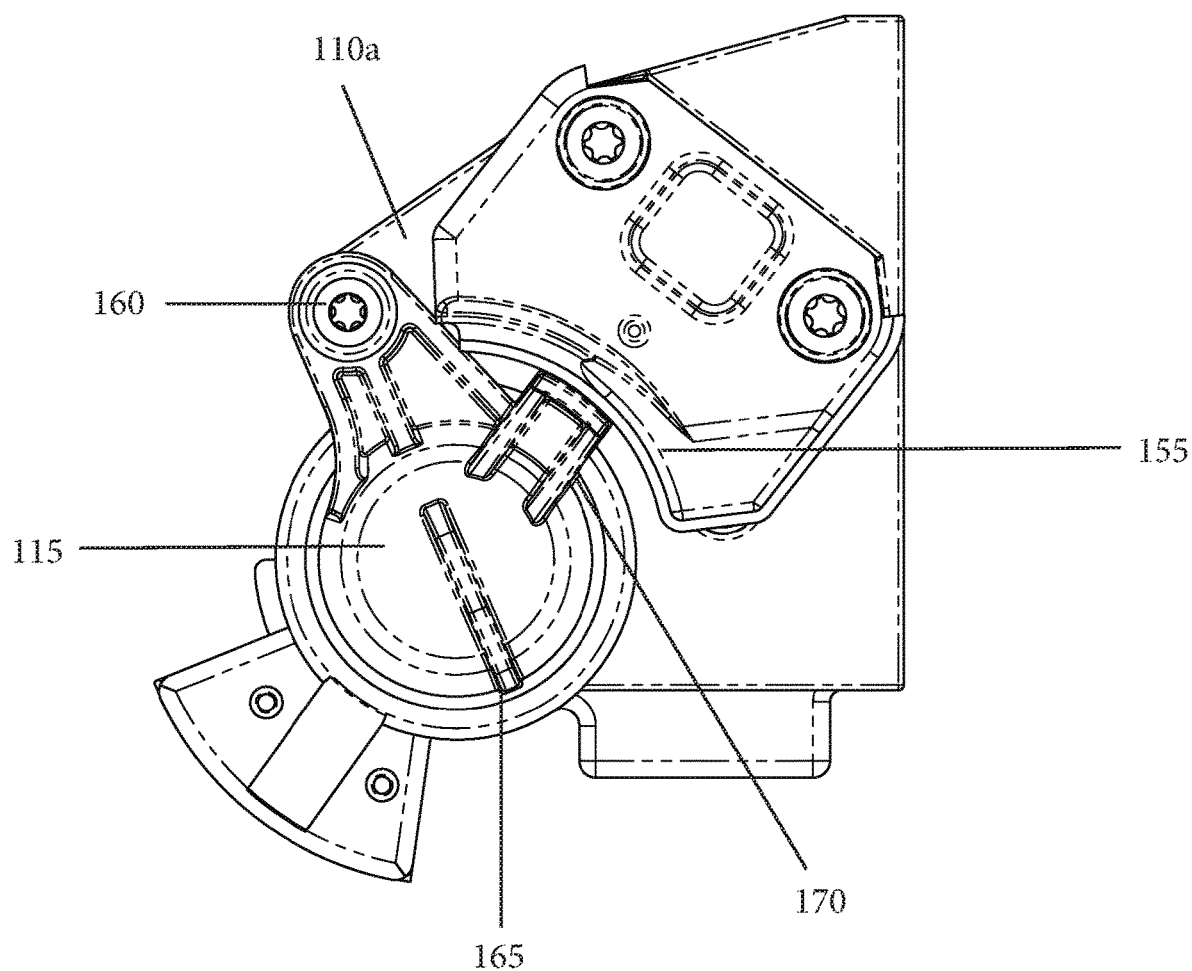
FIG. 3 depicts a view of the illustrative gladhand connector with the swivel cover in the closed position in accordance with some embodiments of the invention.

Referring to FIG. 2, the air hose connector clamp 108 is attached to the housing 105 via the first surface 110a of the base 110. The air hose connector clamp 108 may be attached to the first surface 110a by a fastener 150 or other structure or mechanism. The air hose connector 105 includes a groove 155 or defines a groove 155 between the air hose connector clamp 108 and the first surface 110a. The groove 155 is configured to receive a connector of an air hose, such as a SAE J318 standard coupler. The swivel cover 115 is also attached to the housing 105 via the first surface 110a (FIG. 3). The swivel cover 115 may be attached to the first surface 110a by a fastener 160 or other structure or mechanism. The cover 115 can swivel between an open position (FIG. 2) and a closed position (FIG. 3) via the fastener 160. In the open position, an air hose can be engaged with the gladhand connector 100 by inserting a connector of the air hose into the groove 155 and the opening of the air hose is aligned with the first access port 120. In the closed position, the cover 115 closes off the first access port 120 and air or fluid is prevented from entering or exiting the first access port 120. An air hose is also prevented from engaging with the connector clamp 108 or the groove 155 or aligning with the first access port 120 in the closed position. Preferably, the cover 115 is always in the closed position by default or before an air hose is connected to the first access port 120. The cover 115 swivels in a direction parallel to the first surface 110a.

Figure 4:
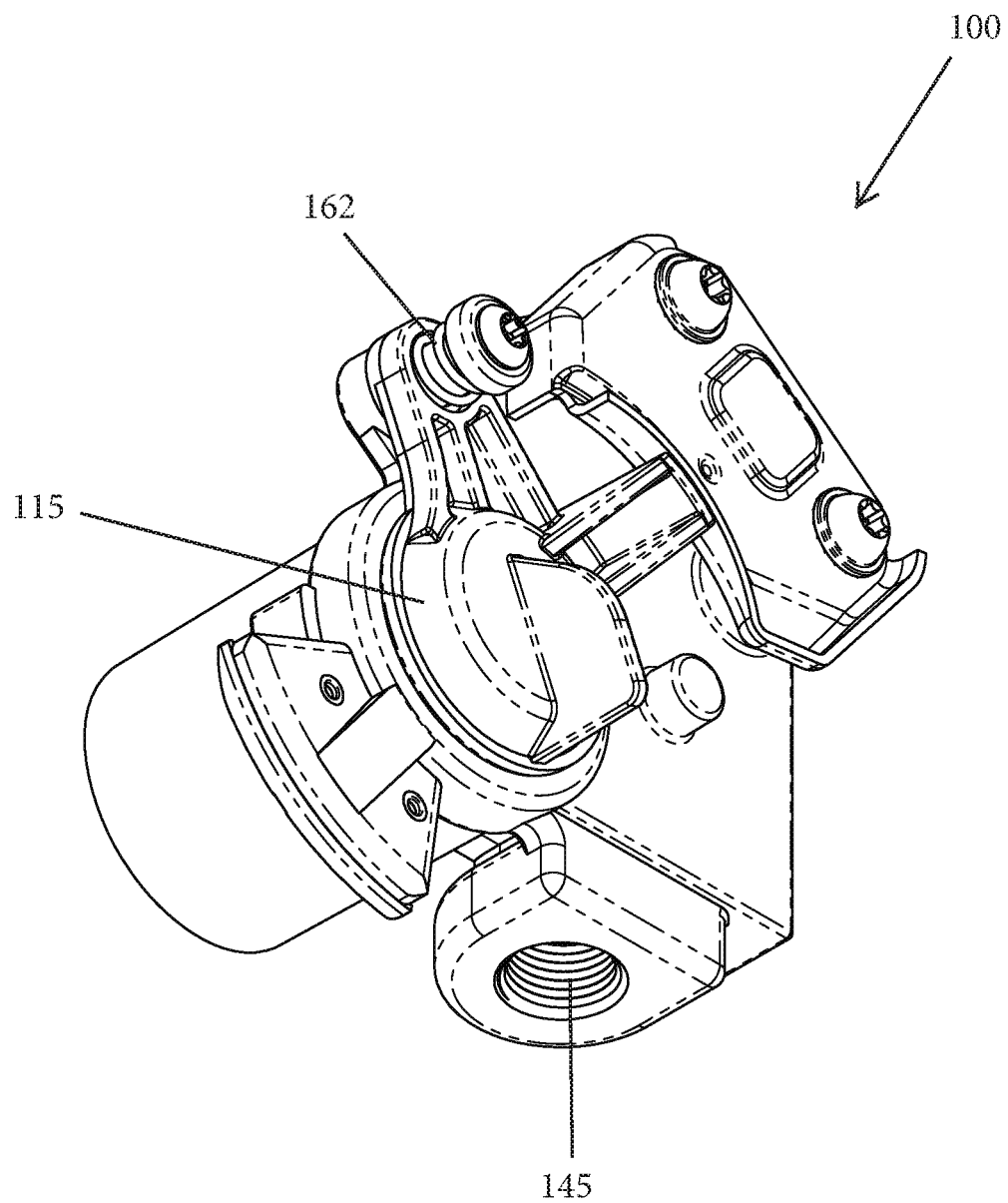
FIG. 4 depicts an isometric bottom view of the illustrative gladhand connector in accordance with some embodiments of the invention.

The cover 115 may include a rib 165 for moving the cover 115 between the open position and the closed position. The cover 115 may also include a stop 170 that contacts the groove 155 and keeps the cover 115 at a distance (greater than 0) from the groove 155 in the closed position. The stop 170 may be configured to have a structure and dimensions that help align the cover 115 and the first access port 120 in the closed position. The stop 170 may be optional, and the alignment of the cover 115 and the first access port 120 can be controlled solely by the fastener 160 and other mechanisms (e.g., spring 162. FIG. 4). The fastener 160 and other mechanisms may be configured to align the cover 115 with the first access port 120 in the closed position and to prevent the cover 115 from swiveling further once the cover 115 reaches the closed position. The alignment can also be achieved by a combination of the stop 170 and the fastener 160 and other mechanisms. The gladhand connector 100 also includes an elastomeric seal 172 configured to be removably mounted in the first access port 120. The seal 172 can be easily replaced when it wears out. FIG. 4 is an isometric bottom view of the gladhand connector 100 showing the swivel cover 115 in the closed position and the second access port 145.

Figure 5:
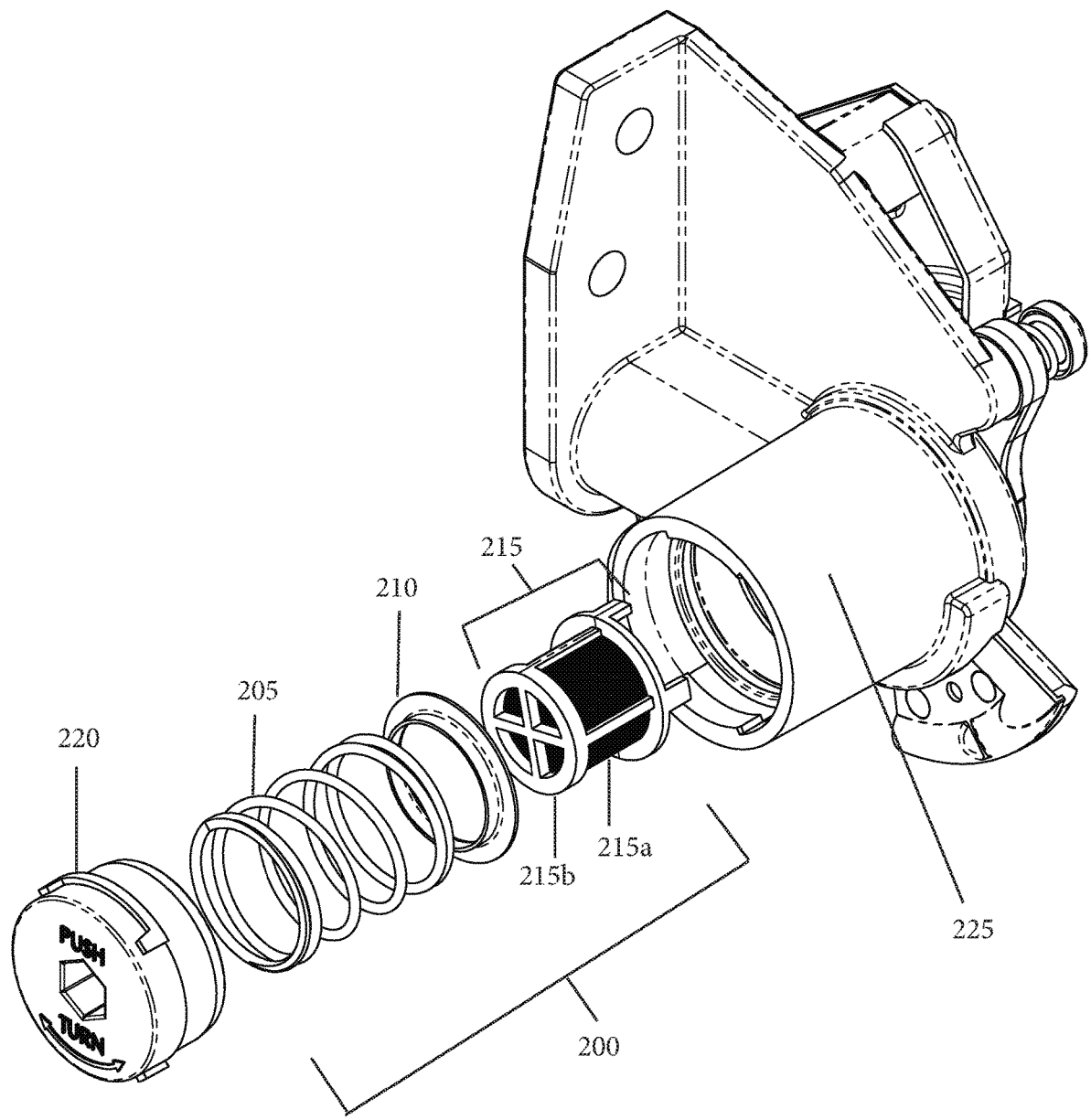
FIG. 5 depicts an exploded view of an illustrative filter assembly in accordance with some embodiments of the invention.

FIG. 5 depicts an exploded view of an illustrative filter assembly 200 in accordance with some embodiments of the invention. The filter assembly 200 comprises a spring 205, a washer 210, and a filter screen 215 having a wire mesh filter basket 215a and a supporting cage 215b containing the wire mesh filter basket 215a. The wire mesh filter basket 215a is preferably made of stainless steel or a similar material. The filter assembly 200 is arranged in a manner such that the spring 205 is contact with the removable cap 220, that the filter screen 215 is closer to the first access port compared to the other two components, and that the washer 210 sandwiched by the spring 205 and the filter screen 215. The filter assembly 200 is a pressure sensitive filter device. The filter assembly 200 is configured to be displaced by air pressure of received air. Air received from the first or second access port exerts an air pressure on the filter screen 215 to compress the spring 205 and allow received air to bypass the filter assembly 200. In other words, the first access port and the second access port define a flow path via the filter assembly 200. The filter assembly 200 is displaceable by the air pressure of the received air without the filter assembly 200 blocking the flow path. For example, the filter assembly 200 may be in an initial or expanded position before air is supplied into the housing. When air is introduced from one of the ports, the air pressure compresses the filter screen 215 toward to the cap 220 and keeps the filter assembly 200 in a compressed position. In this position, air is allowed to flow between the first access port and the second access port and some air may also flow through the filter screen 215. When the air pressure is released, the filter assembly 200 returns to the expanded position. Air pressure may pass freely through the filter screen 215 when it is new or cleaned without compressing the filter and spring assembly 200. As the gladhand connector is used over time, the filter assembly 200 (or the filter screen 215) may become clogged. These features prevent the clogged filter assembly (or the clogged filter screen) from blocking air flow through the ports as the air can displace the clogged filter assembly (or the clogged filter screen) by exerting pressure on the assembly so that air flow can bypass the filter. This provides a safety feature for the air braking system of the vehicles as the flow path (e.g., through the first access port, the receptacle, the intermediate conduit, and the second access port) never completely closes.

Figure 6:
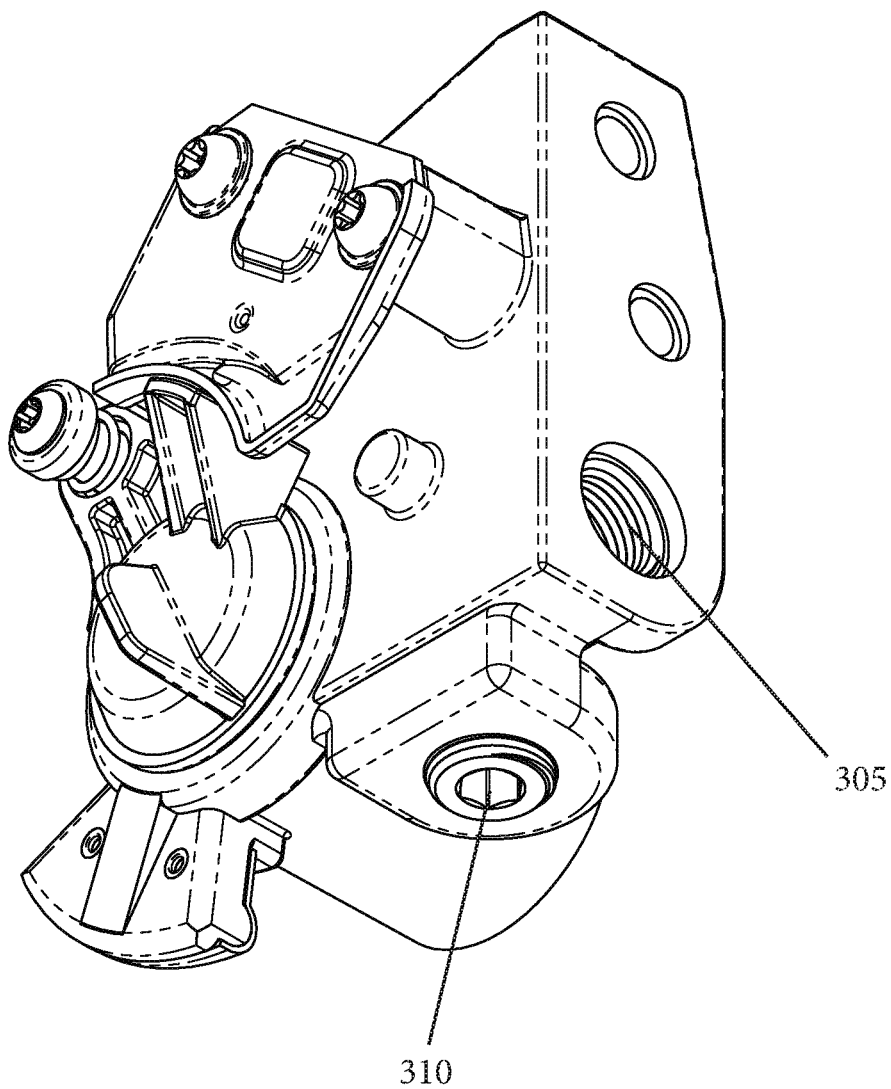
FIG. 6 depicts another isometric bottom view of the illustrative gladhand connector in accordance with some embodiments of the invention.
Figure 7:
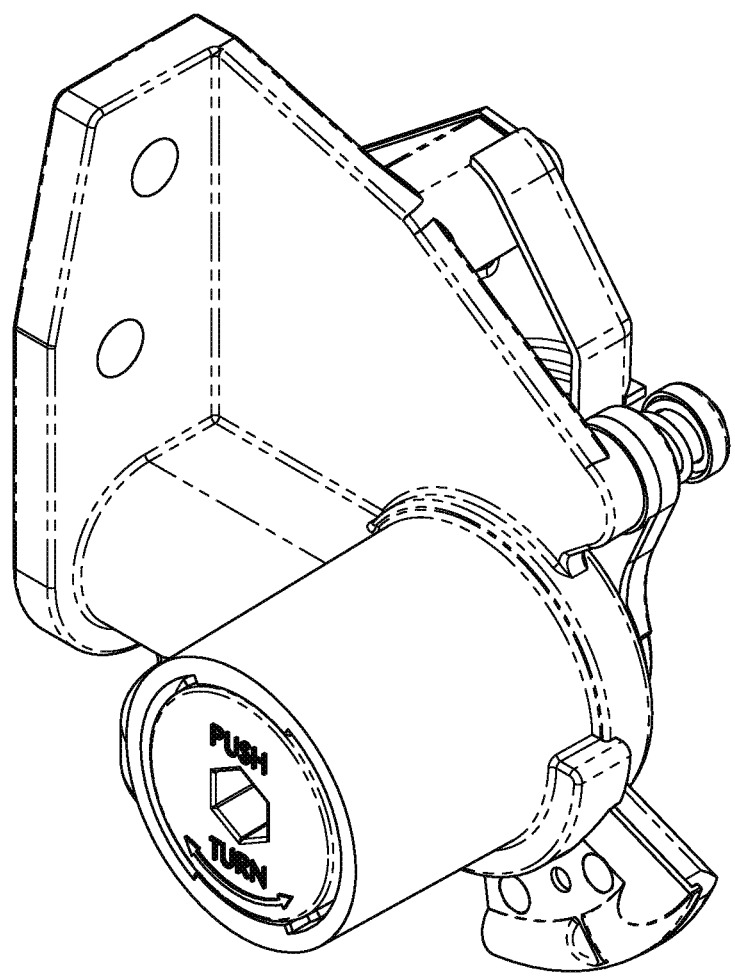
FIG. 7 depicts an isometric top view of the illustrative gladhand connector in accordance with some embodiments of the invention.
Figure 8:
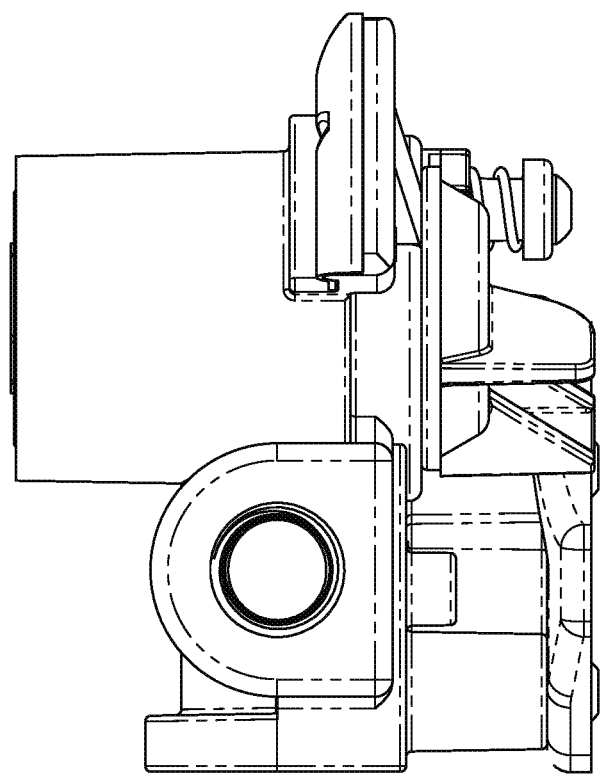
FIG. 8 depicts a bottom view of the illustrative gladhand connector in accordance with some embodiments of the invention.
Figure 9:
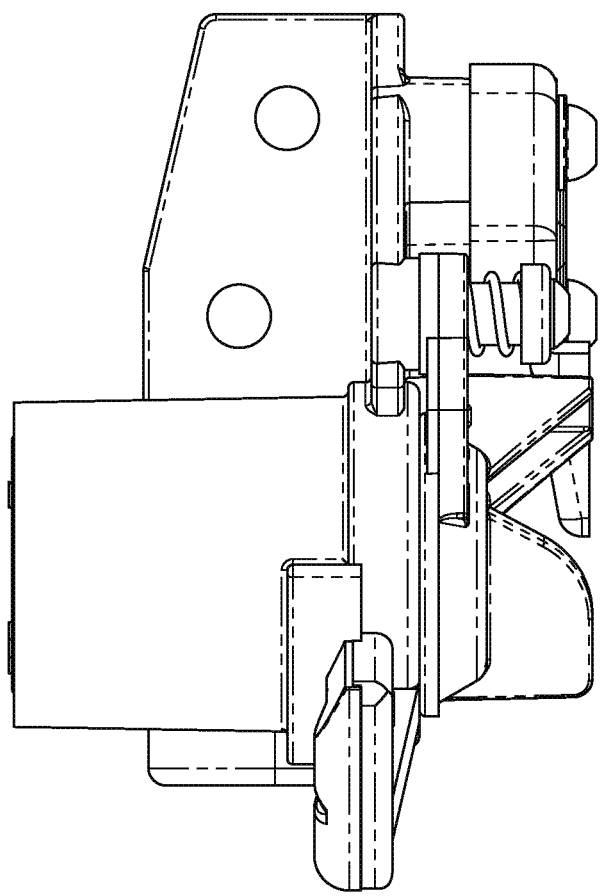
FIG. 9 depicts a front view of the illustrative gladhand connector in accordance with some embodiments of the invention.
Figure 10:
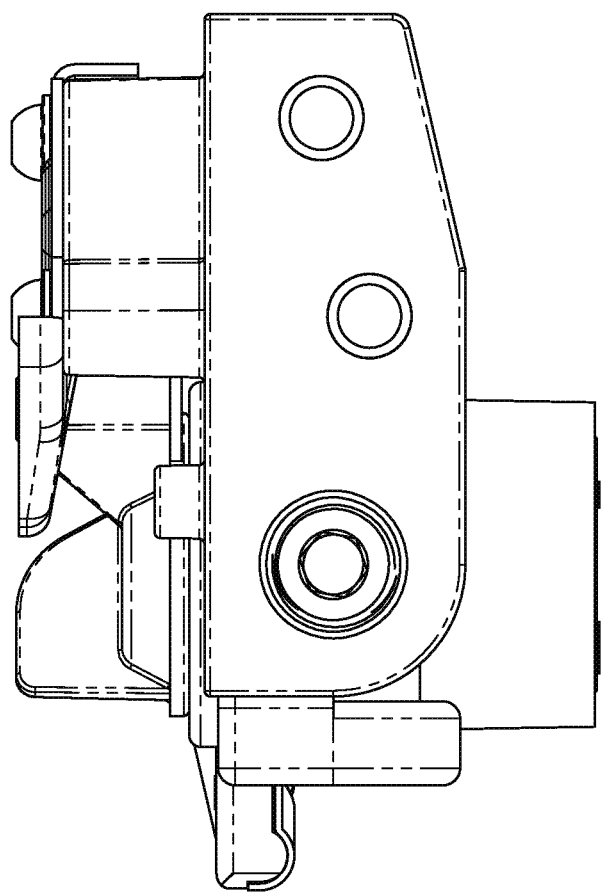
FIG. 10 depicts a back view of the illustrative gladhand connector in accordance with some embodiments of the invention.
Figure 11:
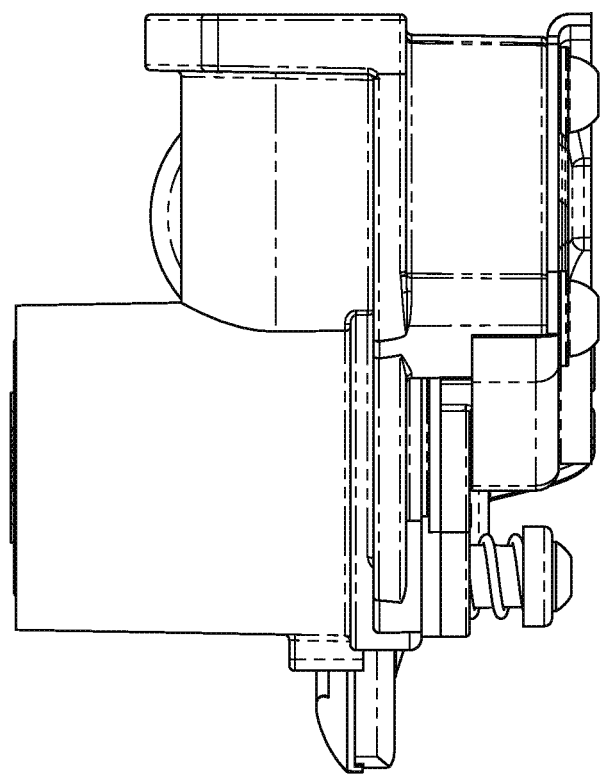
FIG. 11 depicts a top view of the illustrative gladhand connector in accordance with some embodiments of the invention.
Figure 12:
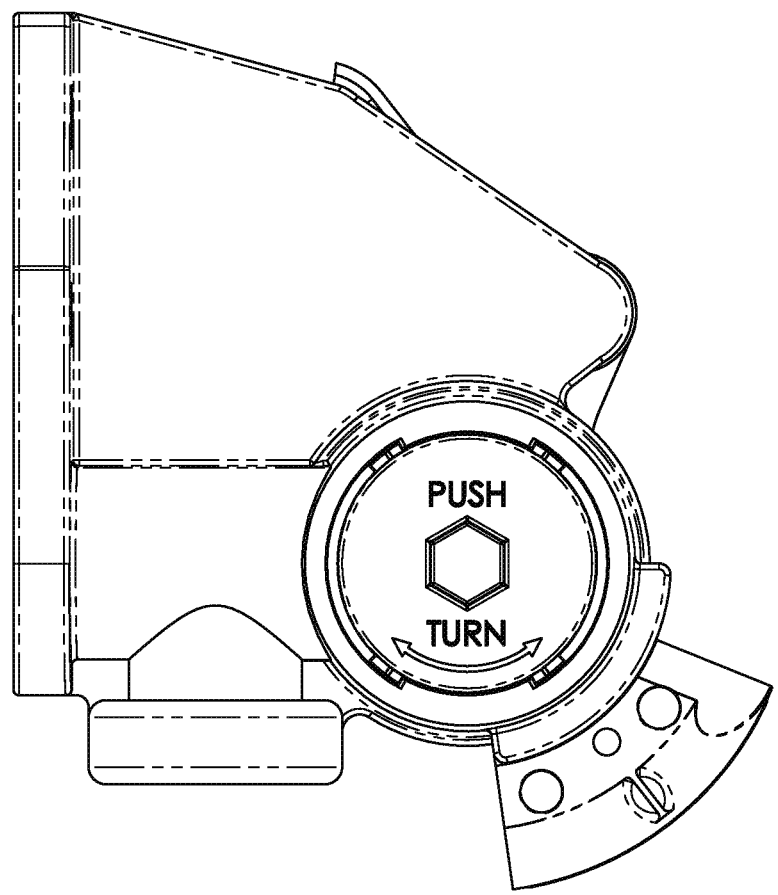
FIG. 12 depicts a left view of the illustrative gladhand connector in accordance with some embodiments of the invention.

In some embodiments, the second access port 145 can be sealed or plugged and the connection between the mounting bracket 115 and the intermediate conduit 140 can be unsealed unplugged. In this situation, air may flow between the first access port 120 and the opening associated with the fastener 142 and air may enter or exit from either port or opening. The opening associated with the fastener 142 may be configured to receive an air hose from a tractor or other vehicle having equipment that can supply air or to a trailer or other vehicle that requires air to operate to operate the air brake system on that vehicle. In this situation, the flow path includes the first access port, the receptacle, the intermediate conduit, and the opening associated with the fastener 142. The second access port 145 and the opening associated with the fastener 142 can be easily sealed or unsealed and either can be used to receive an air hose. The second access port 145 and the opening can be configured to have the same or similar dimensions so that they can be sealed or plugged by the same device. The sealing device can be removed from one of the ports (e.g., the second access port) and be inserted into the other port (e.g., the opening) and vice versa. In some embodiments, both the second access port 145 and the opening may be open and air may enter or exit through both locations. Any one or more of the first access port, the second access port, and the opening can be used as an air entry or exit port. Preferably, the first access port is used as the air entry port whereas the second access port and the opening are used as the air exit ports. FIG. 6 depicts another isometric bottom view of the gladhand connector showing the opening 305 associated with the fastener being open. The second access port 310 can be open or sealed.

The filter assembly 200 is positioned in the receptacle 225 and the receptacle 225 is dosed by a removable cap 220. The cap 220 provides an airtight seal to the receptacle 225. The filter assembly 200 is replaceable, and the cap 220 can be removed to access the filter assembly 200 inside so that the filter assembly 200 can be cleaned or replaced. The filter assembly 200 can be cleaned or replaced in its entirety or individually (referring to each individual component of the filter assembly 200). The cap 220 can be removed by hand, a tool (e.g., a hex key, screw driver, etc.), or a combination thereof.

FIGS. 7-12 depict additional views of the illustrative gladhand connector in accordance with some embodiments of the invention.

The gladhand connector can used on either the supply air line or the control air line in a tractor-trailer. The gladhand connector or one of the components of the gladhand connector can be painted with a color to indicate that the device is associated with the supply air line (e.g., red) or the control air line (e.g., blue). Each of the housing, the air hose connector clamp, and the swivel cover can be made of stainless steel, bronze, aluminum, alloy, plastic, or other corrosion resistant material to prolong the service life of the gladhand connector. The housing is preferably one single, integrated device. The base, mounting bracket, receptacle, and intermediate conduit are fabricated from the same mold or same molding process simultaneously. The base, mounting bracket, receptacle, and intermediate conduit may also be separate components connected together via fasteners, screws, threads, or other means.

Although the above disclosure describes that the gladhand connector can be used to connect air hoses or vehicles, the gladhand connector can be similarly used to connect other hoses, pipes, or tubes in other applications or fields (e.g., air/fluid pipes in a building, equipment, machine, automatable, etc.).

The terms connect, attach, secure, affix, and other similar terms may refer to either direct or indirect connection. Direct connection may refer to that the components are physically contacting each other. Indirect direction may refer to that the components axe connected to each other through one or more intermediary mechanisms. In a preferred embodiment, these terms refer to direct connection.

It is understood that broader, narrower, or different combinations of the described features are contemplated, such that, for example features can be removed or added in a broadening or narrowing way. Applications of the technology to other fields are also contemplated.

Exemplary gladhand connectors and components are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A gladhand connector comprising:
a housing having:
a base including:
a first surface and a second surface;
an air hose connector clamp on the first surface; and
a first access port extending from the first surface toward the second surface;
a second access port;
wherein the access ports are in fluid communication with an intermediate conduit configured to direct air received from an air hose through the housing;
a receptacle adjacent the first access port and in fluid communication with one of the access ports, wherein the receptacle is configured to receive a pressure sensitive, removable and replaceable filter assembly configured to filter debris; and
a mounting bracket extending from the base configured to be attached to a vehicle;
wherein the intermediate conduit is in fluid communication with the receptacle via one end of the intermediate conduit, and the intermediate conduit is secured to the mounting bracket via another end of the intermediate conduit to prevent air from exiting the mounting bracket, and
wherein the filter assembly is configured to be displaced by air pressure of received air to allow the received air to bypass the filter assembly.

2. The gladhand connector of claim 1, wherein the receptacle is connected to the base from the second surface and includes a cap that is removable to provide access to the filter assembly, wherein the cap is removable by a hex key.

3. The gladhand connector of claim 1, further comprising a swivel cover on the first surface configured to swivel between an open position and a closed position, wherein the swivel cover closes off the first access port in the closed position.

4. The gladhand connector of claim 1, wherein the filter assembly includes a removable filter cap, a washer, a spring, and a filter screen comprising a wire mesh basket.

5. The gladhand connector of claim 4, wherein the filter assembly is configured to be displaced by the air pressure of the received air when the filter screen is clogged.

6. The gladhand connector of claim 1, wherein the mounting bracket includes one or more holes to receive fasteners.

7. The gladhand connector of claim 1, wherein the mounting bracket is perpendicular to the base.

8. The gladhand connector of claim 1, wherein the mounting bracket includes a clamping portion that is made of stainless steel.

9. The gladhand connector of claim 1, further comprising an elastomeric seal configured to be removably mounted in the first access port.

10. The gladhand connector of claim 1, wherein the first access port or the second access port is configured to receive and connect to an air hose.

11. A gladhand connector comprising:
- a housing having a side surface and a bottom surface, the housing further including:
  - a first access port on the side surface and a second access port on the bottom surface;
  - a receptacle connected to the first access port configured to receive a replaceable filter device that filters debris;
  - a mounting bracket extending from the side surface configured to be attached to a vehicle;
  - a swivel cover attached to the housing through the side surface, wherein the cover is configured to swivel between an open position and a closed position and the cover closes off the first access port in the closed position; and
- wherein the first access port and the second access port define a flow path via a replaceable filter assembly, the first access port is configured to receive air from an air hose and the replaceable filter device is displaceable by air pressure of received air without blocking the flow path.

12. The gladhand connector of claim 11, wherein the mounting bracket is perpendicular to the side surface of the housing.

13. The gladhand connector of claim 11, wherein mounting bracket includes one or more holes to receive fasteners.

14. The gladhand connector of claim 13, wherein the mounting bracket seals the flow path to prevent air exiting from the mounting bracket.

15. The gladhand connector of claim 11, wherein the cover swivels in a direction parallel to the side surface of the housing.

16. The gladhand connector of claim 11, wherein the filter assembly comprises a removable filter cap, a washer, a spring, and a filter screen comprising a wire mesh basket, and is displaceable by air pressure of the air received from the first access port or the second access port without blocking the flow path when the filter screen is clogged.

17. The gladhand connector of claim 11, wherein the housing further comprises an intermediate conduit connecting the receptacle and the mounting bracket, wherein the intermediate conduit forms part of the flow path.

18. The gladhand connector of claim 17, wherein the mounting bracket seals the flow path via the intermediate conduit to prevent air exiting from the mounting bracket.

19. The gladhand connector of claim 18, wherein the mounting bracket includes a clamping portion that is made of stainless steel.

20. The gladhand connector of claim 18, further comprising an elastomeric seal configured to be removably mounted in the first access port.

21. The gladhand connector of claim 11, wherein the first access port or the second access port is configured to receive and connect to an air hose.

* * * * *